(12) United States Patent
Herz et al.

(10) Patent No.: US 9,832,610 B2
(45) Date of Patent: Nov. 28, 2017

(54) SYSTEM FOR COLLECTING, ANALYZING, AND TRANSMITTING INFORMATION RELEVANT TO TRANSPORTATION NETWORKS

(71) Applicant: Apple Inc., Cupertino, CA (US)

(72) Inventors: Frederick S. M. Herz, Warrington, PA (US); Pierre Lemaire, Philadelphia, PA (US); Jean H. Lemaire, Marlton, NJ (US); Walter Paul Labys, Logan, UT (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/242,235

(22) Filed: Aug. 19, 2016

(65) Prior Publication Data

US 2017/0048672 A1 Feb. 16, 2017

Related U.S. Application Data (60) Division of application No. 14/309,470, filed on Jun. 19, 2014, now Pat. No. 9,451,019, which is a
(Continued)

(51) Int. Cl.
*H04L 29/08* (2006.01)
*H04W 4/02* (2009.01)
(Continued)

(52) U.S. Cl.
CPC ........ *H04W 4/023* (2013.01); *G01C 21/3415* (2013.01); *G01C 21/3602* (2013.01);
(Continued)

(58) Field of Classification Search
CPC .......... G08G 1/096827; G06F 11/3438; G01C 21/343; G01C 21/3679; G01C 21/3617;
(Continued)

(56) References Cited

U.S. PATENT DOCUMENTS

| 31,044 A | 1/1861 | Weber |
|---|---|---|
| 4,153,874 A | 5/1979 | Kaestner |

(Continued)

FOREIGN PATENT DOCUMENTS

| EP | 700226 | 3/1996 |
|---|---|---|
| GB | 2277844 A | 11/1994 |

(Continued)

OTHER PUBLICATIONS

International Search Report for PCT Application No. PCT/US00/13858, dated Feb. 14, 2001.
(Continued)

*Primary Examiner* — Eric W Shepperd
(74) *Attorney, Agent, or Firm* — Kilpatrick Townsend & Stockton LLP (57) ABSTRACT

When individual persons or vehicles move through a transportation network, they are likely to be both actively and passively creating information that reflects their location and current behavior. In this patent, we propose a system that makes complete use of this information. First, through a broad web of sensors, our system collects and stores the full range of information generated by travelers. Next, through the use of previously-stored data and active computational analysis, our system deduces the identity of individual travelers. Finally; using advanced data-mining technology, our system selects useful information and transmits it back to the individual, as well as to third-party users; in short, it forms the backbone for a variety of useful location-related end-user applications.

26 Claims, 2 Drawing Sheets

Related U.S. Application Data continuation of application No. 13/429,186, filed on Mar. 23, 2012, now Pat. No. 8,799,461, which is a continuation of application No. 09/690,046, filed on Oct. 16, 2000, now abandoned.

(60) Provisional application No. 60/159,772, filed on Oct. 15, 1999.

(51) Int. Cl.

| | | |
|---|---|---|
| *G01C 21/36* | (2006.01) | |
| *H04W 8/18* | (2009.01) | |
| *G01C 21/34* | (2006.01) | |
| *G06Q 30/02* | (2012.01) | |
| *G06Q 40/08* | (2012.01) | |
| *G08G 1/096* | (2006.01) | |
| *G06Q 10/10* | (2012.01) | |
| *H04W 4/22* | (2009.01) | |

(52) U.S. Cl.
CPC ..... *G01C 21/3617* (2013.01); *G01C 21/3679* (2013.01); *G01C 21/3682* (2013.01); *G01C 21/3697* (2013.01); *G06Q 10/1093* (2013.01); *G06Q 30/02* (2013.01); *G06Q 30/0261* (2013.01); *G06Q 30/0265* (2013.01); *G06Q 30/0267* (2013.01); *G06Q 30/0269* (2013.01); *G06Q 40/08* (2013.01); *G08G 1/096* (2013.01); *H04L 67/1025* (2013.01); *H04L 67/12* (2013.01); *H04L 67/125* (2013.01); *H04L 67/18* (2013.01); *H04L 67/20* (2013.01); *H04L 67/22* (2013.01); *H04L 67/2847* (2013.01); *H04L 67/303* (2013.01); *H04L 67/306* (2013.01); *H04W 4/02* (2013.01); *H04W 4/028* (2013.01); *H04W 8/18* (2013.01); *H04W 4/22* (2013.01)

(58) Field of Classification Search
CPC ............... H04L 67/025; H04L 67/1021; H04L 67/1025; H04L 67/1095; H04L 67/125; H04L 67/18; H04L 67/22; H04L 67/306; H04W 4/02; H04W 4/028; H04W 4/18
See application file for complete search history.

(56) References Cited

U.S. PATENT DOCUMENTS

| | | |
|---|---|---|
| 4,170,782 A | 10/1979 | Miller |
| 4,264,924 A | 4/1981 | Freeman |
| 4,381,522 A | 4/1983 | Lambert |
| 4,529,870 A | 7/1985 | Chaum |
| 4,694,490 A | 9/1987 | Harvey et al. |
| 4,704,725 A | 11/1987 | Harvey et al. |
| 4,706,080 A | 11/1987 | Sincoskie |
| 4,706,121 A | 11/1987 | Young |
| 4,745,549 A | 5/1988 | Hashimoto |
| 4,751,578 A | 6/1988 | Reiter et al. |
| 4,759,063 A | 7/1988 | Chaum |
| 4,853,678 A | 8/1989 | Bishop, Jr. et al. |
| 4,914,698 A | 4/1990 | Chaum |
| 4,926,480 A | 5/1990 | Chaum |
| 4,947,430 A | 8/1990 | Chaum |
| 4,954,959 A | 9/1990 | Moroto et al. |
| 4,965,825 A | 10/1990 | Harvey et al. |
| 4,977,455 A | 12/1990 | Young |
| 4,987,593 A | 1/1991 | Chaum |
| 5,003,591 A | 3/1991 | Kauffman et al. |
| 5,075,771 A | 12/1991 | Hashimoto |
| 5,109,414 A | 4/1992 | Harvey et al. |
| 5,131,039 A | 7/1992 | Chaum |
| 5,136,501 A | 8/1992 | Silverman et al. |
| 5,151,789 A | 9/1992 | Young |
| 5,155,591 A | 10/1992 | Wachob |
| 5,223,924 A | 6/1993 | Strubbe |
| 5,230,020 A | 7/1993 | Hardy et al. |
| 5,233,654 A | 8/1993 | Harvey et al. |
| 5,237,157 A | 8/1993 | Kaplan |
| 5,245,420 A | 9/1993 | Harney et al. |
| 5,245,656 A | 9/1993 | Loeb et al. |
| 5,251,324 A | 10/1993 | McMullan, Jr. |
| 5,276,736 A | 1/1994 | Chaum |
| 5,301,109 A | 4/1994 | Landauer et al. |
| 5,321,833 A | 6/1994 | Chang et al. |
| 5,331,554 A | 7/1994 | Graham |
| 5,331,556 A | 7/1994 | Black, Jr. et al. |
| 5,351,059 A | 9/1994 | Tsuyuki |
| 5,351,075 A | 9/1994 | Herz et al. |
| 5,353,121 A | 10/1994 | Young et al. |
| 5,373,558 A | 12/1994 | Chaum |
| 5,396,429 A | 3/1995 | Hanchett |
| 5,396,540 A | 3/1995 | Gooch |
| 5,408,419 A | 4/1995 | Wong |
| 5,410,344 A | 4/1995 | Graves et al. |
| 5,446,659 A | 8/1995 | Yamawaki |
| 5,469,206 A | 11/1995 | Strubbe et al. |
| 5,483,278 A | 1/1996 | Strubbe et al. |
| 5,534,911 A | 7/1996 | Levitan |
| 5,541,638 A | 7/1996 | Story |
| 5,548,822 A | 8/1996 | Yogo |
| 5,572,221 A * | 11/1996 | Marlevi ............... H04W 28/18 342/452 |
| 5,579,535 A | 11/1996 | Orlen et al. |
| 5,600,364 A | 2/1997 | Hendricks et al. |
| 5,613,209 A | 3/1997 | Peterson et al. |
| 5,642,484 A | 6/1997 | Harrison, III et al. |
| 5,717,923 A | 2/1998 | Dedrick |
| 5,724,567 A | 3/1998 | Rose et al. |
| 5,724,660 A | 3/1998 | Kauser et al. |
| 5,742,905 A | 4/1998 | Pepe et al. |
| 5,754,938 A | 5/1998 | Herz et al. |
| 5,754,939 A | 5/1998 | Herz et al. |
| 5,802,292 A | 9/1998 | Mogul |
| 5,835,061 A | 11/1998 | Stewart |
| 5,855,008 A | 12/1998 | Goldhaber et al. |
| 5,875,108 A * | 2/1999 | Hoffberg ............... G06F 3/00 382/181 |
| 5,875,400 A * | 2/1999 | Madhavapeddy .... H04W 68/04 455/435.2 |
| 5,948,061 A | 9/1999 | Merriman et al. |
| 5,960,454 A | 9/1999 | Mandal et al. |
| 5,987,377 A | 11/1999 | Westerlage et al. |
| 5,991,306 A | 11/1999 | Burns et al. |
| 6,011,515 A | 1/2000 | Radcliffe et al. |
| 6,014,090 A | 1/2000 | Rosen et al. |
| 6,047,327 A | 4/2000 | Tso et al. |
| 6,052,064 A | 4/2000 | Budnik et al. |
| 6,088,598 A | 7/2000 | Marsolais |
| 6,138,026 A | 10/2000 | Irvin et al. |
| 6,144,917 A | 11/2000 | Walters et al. |
| 6,154,745 A | 11/2000 | Kari et al. |
| 6,199,045 B1 | 3/2001 | Giniger et al. |
| 6,208,975 B1 | 3/2001 | Bull et al. |
| 6,216,088 B1 | 4/2001 | Schulz et al. |
| 6,219,793 B1 * | 4/2001 | Li ....................... B60R 25/2018 726/19 |
| 6,249,252 B1 | 6/2001 | Dupray |
| 6,259,381 B1 | 7/2001 | Small |
| 6,259,923 B1 | 7/2001 | Lim et al. |
| 6,341,255 B1 | 1/2002 | Lapidot |
| 6,381,465 B1 | 4/2002 | Chern et al. |
| 6,397,040 B1 | 5/2002 | Titmuss et al. |
| 6,456,852 B2 | 9/2002 | Bar et al. |
| 6,490,519 B1 | 12/2002 | Lapidot et al. |
| 6,571,279 B1 | 5/2003 | Herz et al. |
| 6,591,103 B1 | 7/2003 | Dunn et al. |
| 6,597,682 B1 * | 7/2003 | Kari ....................... H04J 3/1647 370/329 |
| 6,675,081 B2 | 1/2004 | Shuman et al. |
| 6,718,173 B1 | 4/2004 | Somani et al. |
| 6,810,257 B1 | 10/2004 | Amin |
| 7,072,849 B1 | 7/2006 | Filepp et al. |

(56) References Cited

U.S. PATENT DOCUMENTS

| | | | | |
|---|---|---|---|---|
| 8,756,153 | B1* | 6/2014 | Rolf | G06Q 20/04 705/38 |
| 2002/0046084 | A1 | 4/2002 | Steele et al. | |
| 2002/0167442 | A1* | 11/2002 | Taylor | G01C 21/36 342/357.64 |
| 2008/0068142 | A1 | 3/2008 | Obradovich et al. | |
| 2008/0288478 | A1 | 11/2008 | Klug et al. | |

FOREIGN PATENT DOCUMENTS

| | | |
|---|---|---|
| WO | 94/11967 | 5/1994 |
| WO | 96/42179 A1 | 12/1996 |
| WO | 97/41654 | 11/1997 |
| WO | 99/30273 | 6/1999 |
| WO | 00/04730 | 1/2000 |

OTHER PUBLICATIONS

Scatter/Gather: A Cluster-based Approach to Browsing Large Document Collections by Cutting et al., 15th Ann Int'l Sigir '92, ACM 318-329.

"Evolving Agents for Personalized Information Filtering", Sheth et al., Proc. 9th IEEE Conference on A1 for Applications.

"A Secure and Privacy-Protecting Protocol for Transmitting Personal Information Between Organizations" Chaum et al.

Otis Port, "Wonder Chips—How They'll Make Computing Power Ultrafast and Ultracheap", Business Week, Jul. 4, 1994, pp. 86-92.

Jonathan Berry, "A Potent New Tool for Selling Database Marketing", Business Week, Sep. 5, 1994, pp. 34-40.

William L. Thomas, "Electronic Program Guide Applications—The Basics of System Design", 1994 NCTA Technical Papers, pp. 15-20.

Judith H. Irven et al., "Multi-Media Information Services: A Laboratory Study", IEEE Communications Magazine, vol. 26, No. 6, Jun. 1988, pp. 24-44.

Tak W. Yan & Hector Garcia-Molina, SIFT—A Tool for Wide-Area Information Dissemination, 1995 USENIX Technical Conference, New Orleans, LA., Jan. 16-20, pp. 177-186.

Masahiro Morita & Yoichi Shinoda, Information Filtering Based on User Behavior Analysis and Best Match Text Retrieval, Proceedings of the Seventeenth Annual Internatonal ACM-SIGIR Conference on Research and Development in Information Retrieval, Dublin, Jul. 3-6, 1994, pp. Title p. (272)-281.

Jim Binkley & Leslie Young, Rama: An Architecture for Internet Information Filtering, Journal of Intelligent Information Systems: Integrating Artificial and Database Technologies, vol. 5, No. 2, Sep. 1995, pp. 81-99.

Foltz, P.W., Dumais, S.T., "Personalized Information Delivery: An Analysis of Information Filtering Methods", Communications of the ACM, Dec. 1992, vol. 35, No. 12, pp. 51-60.

Belkin, N.J., Croft, W.B., "Information Filtering and Information Retrieval: Two Sides of the Same Coin?", Communications of the ACM, Dec. 1992, vol. 35, No. 12, pp. 29-38.

Chalmers, M., Chitson, P., "Bead: Explorations in Information Visualization", 15th Ann. Int'l SIGIR 92/Denmark—Jun. 1992, pp. 330-337.

Willett, P., "Recent Trends in Hierarchic Document Clustering: A Critical Review", Information Processing & Management, vol. 24, No. 5, pp. 557-597, 1988.

Damashek, M., Gauging Similarity via N-Grams: Language-Independent Sorting, Categorization, and Retrieval of Text, pp. 1-11, Jan. 24, 1995.

Salton G., "Developments in Automatic Text Retrieval", vol. 253, pp. 974-980, Aug. 30, 1991.

Chaum, D., "Archieving Electronic Privacy", Scientific American, Aug. 1992, pp. 96-101.

Loeb, S., "Architecting Personalized Delivery of Multimedia Information", Communications of the ACM, Dec. 1992, vol. 35, No. 12, pp. 39-50.

Sincoskie, W.D. & Cotton C.J. "Extended Bridge Algorithms for Large Networks", IEEE Network, Jan. 1988—vol. 2, No. 1, pp. 16-24.

Deering S.; Estrin, D.; Farinacci, D.; Jacobson, V.; Liu, C.; Wei, L; "An Architecture for Wide-Area Multicast Routing", Computer Communication Review, vol. 24, No. 4, Oct. 1994, Proceedings of SIGCOMM '94, pp. 126-135.

Bolot, J.; Turletti, T. & Wakeman, I.; "Scalable Feedback Control for Multicast Video Distribution in the Internet", Computer Communication Review, vol. 24, No. 4, Oct. 1994, Proceedings of SIGCOMM '94, pp. 58-67.

Rivest, R.L.; Shamir, A & Adleman, L.; "A Method for Obtaining Digital Signatures and Public-Key Cryptosystems", Communications of the ACM, Feb. 1978, vol. 21, No. 2, pp. 120-126.

Chaum, D. "Security without Identification: Card Computers to Make Big Brother Obsolete", Communications of the ACM, 28(10), Oct. 1985, pp. 1030-1044.

Chaum, D. "Untraceable Electronic Mail, Return Addresses, and Digital Pseudonyms", Communictions of the ACM, vol. 24, No. 2, Feb. 1981.

Rose, D.E.; Mander, R.; Oren, T., Ponceleon, D.B.; Salomon, G. & Wong, Y.Y. "Content Awareness in a File System Interface Implementing the 'Pile' Metaphor for Organizing Information", 16 Ann. Int'l SIGIR '93, ACM, pp. 260-269.

Chan et al. "A Qos Adaptive Mobility Prediction Scheme for Wireless Networks" [Online], 1998 [Retrieved on: Mar. 14, 2014], IEEE, [Retrieved from: https://www.google.com/url?sa=t&rct=j& q=&esrc=s&source=web&cd=1&cad=rja&uact=8& ved=OCD8QFJAA&url=http%3A%2F%2Fieeexplore,ieee. org%2Fxpls%2Fabs_all.jsp%3Farnumber%3D776573& ei=EVgrU5z-DcTb0QGBpYHQCw&usg=AFQ].

Ghai et al. "A Protocol for Seamless Communication in a Picocellular Netowrk" [Online], 1994 [Retrieved on Mar. 147, 2014], IEEE, [Retrieved from: https://www.google.com/url?sa=t&rct=j& q=&esrc=s&source=web&cd=2&cad=rja&uact=8& ved=OCD8QFJAB&url=http%3A%2F%2Fieeexplore,ieee. org%2Fxpls%2Fabs_all.jsp%3Farnumber%3D776573& ei=PYgrU7jiD6LF0QG5jlCwBg&usg=AFQ].

Final Office Action dated May 9, 2013 in U.S. Appl. No. 13/429,186. 24 pages.

Non-Final Office Action dated Oct. 25, 2013 in U.S. Appl. No. 13/429,186. 25 pages.

Notice of Allowance dated Apr. 2, 2014 in U.S. Appl. No. 13/429,186. 13 pages.

Non-Final Office Action dated Sep. 14, 2015 in U.S. Appl. No. 14/309,470. 16 pages.

Notice of Allowance dated Feb. 12, 2016 in U.S. Appl. No. 14/309,470. 10 pages.

Notice of Allowance dated May 20, 2016 in U.S. Appl. No. 14/309,470. 9 pages.

\* cited by examiner

Figure 1: Schematic of LEIA Process

Figure 2: Simplified Example of LEIA Applied to Automobiles

SYSTEM FOR COLLECTING, ANALYZING, AND TRANSMITTING INFORMATION RELEVANT TO TRANSPORTATION NETWORKS

CROSS-REFERENCES TO RELATED APPLICATIONS

This application is a divisional of U.S. patent application Ser. No. 14/309,470, filed on Jun. 19, 2014, entitled "System For Collecting, Analyzing, and Transmitting Information Relevant to Transportation of Networks," which is a continuation of and claims the benefit of priority under 35 U.S.C. §120 to U.S. patent application Ser. No. 13/429,186 (now U.S. Pat. No. 8,799,461 issued Aug. 5, 2014), filed on Mar. 23, 2012, entitled "System For Collecting, Analyzing, and Transmitting Information Relevant to Transportation of Networks," which is a continuation of and claims the benefit of priority under 35 U.S.C. §120 to U.S. patent application Ser. No. 09/690,046, filed on Oct. 16, 2000, entitled "System For Collecting, Analyzing, and Transmitting Information Relevant to Transportation of Networks," which claims the benefit of U.S. Provisional Patent Application No. 60/159,772, filed 15 Oct. 1999, entitled "System for Collecting, Analyzing and Transmitting information Relevant to Transportation Networks" and are hereby incorporated by reference in their entirety.

BACKGROUND OF THE INVENTION

When individual persons or vehicles move through a transportation network, they are likely to be both actively and passively creating information that reflects their location and current behavior. In this patent, we propose a system that makes complete use of this information. First, through a broad web of sensors, our system collects and stores the full range of information generated by travelers. Next, through the use of previously-stored date, and active computational analysis, our system deduces the identity of individual travelers. Finally, using advanced data-mining technology, our system selects useful Information and transmits it back to the individual, as well as to third-party users; in short, it forms the backbone for a variety of useful location-related end-user applications.

BRIEF SUMMARY OF THE INVENTION

It is our contention that such information is even more valuable when it is gathered and stored centrally. This allows for the application of advanced data analysis techniques that can detect patterns and form connections across the data sets, which may be of great value both to the original traveler as well as to interested third parties. For example, it may be that the congestion of the harbor (i.e. ship traffic) has a significant impact on the travel times of the commuter boat. Our system would detect this connection by correlating the ferry's arrival and departure times with the harbor radar data. Using this information, a real-time navigational application could then allow the ferry operator to make precise predictions for the estimated time of arrival, given the current state of the harbor traffic.

Figure 1:
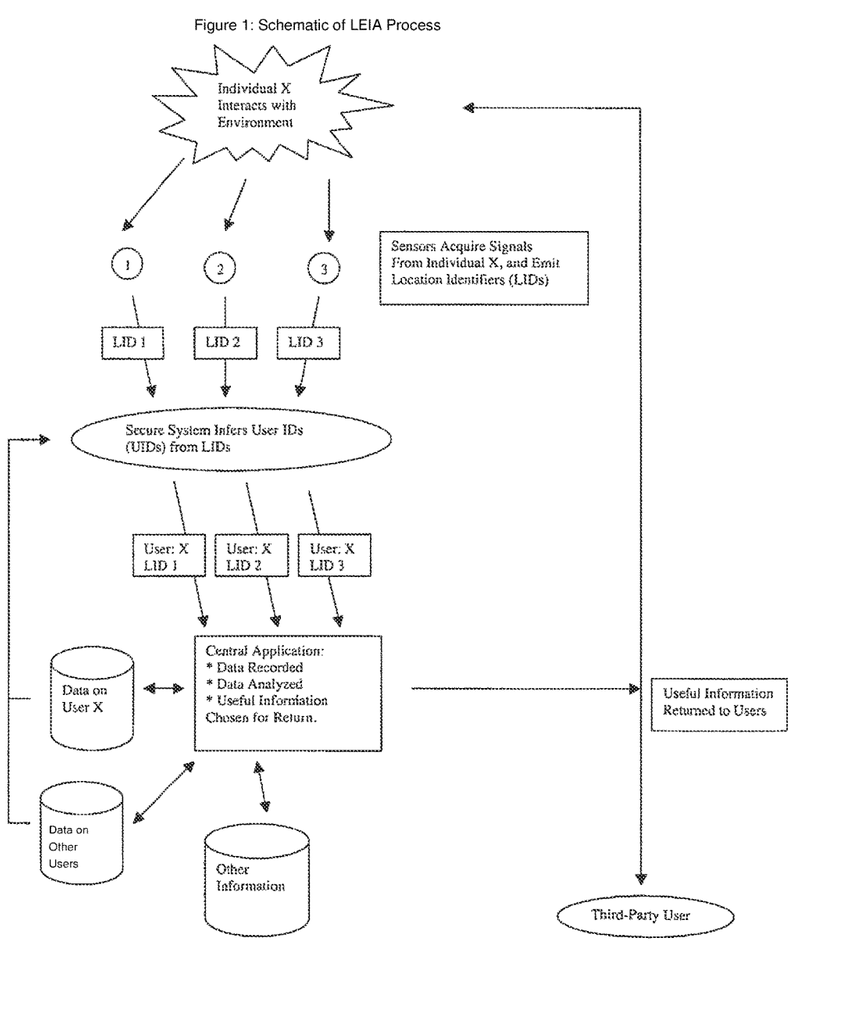
FIG. 1 is a schematic of the Location Enhancement Information Architecture.

As outlined in a previous patent, LEIA (Location Enhanced Information Architecture) provides a framework for the collection, analysis, and retransmission of relevant data. This is a very general architecture which can be broken down into, the following steps (FIG. 1 provides a schematic of this process):

1. Sensors Acquire Signals from an Individual User

These signals include everything that can be used to identify and geographically locate an individual, be they from Active Badges, cellular phones, motion detectors, EZ-Pass toll-booth devices, interactions with a computer workstation, etc. Such signals may be actively or passively generated.

2. Sensors Emit Location Identifiers (LID)

Having detected an individual, sensors transmit special codes, called LIDs, to a central server. LIDS include location, time stamp, and signal information.

3. Secure System translates LIDs to User Identifiers (UID)

Content of LID used to infer user's identity; the UID that is chosen may be pseudonymous (to protect privacy at this stage). At this point the system has both locational/behavioral information (contained in the LIDs) as well as information on a user's identity.

4. UIDs Used to Access Personal Profile Data.

This may be done by means of a proxy server, in the case of pseudonymous UID.

5. User Identity, Location, and Personal Profile Data Used in Choice of Most Relevant Information Set The most relevant information depends on the nature of the particular application, and is determined by the LID and profile data connected to the UID. Generally, the LID contains information about the current state of the individual, whereas the UID links to past information (the "history" or "profile of the" individual). Applications will generally make use of the individual user's profile, other users profiles, and background information relevant to the domain (e.g. weather or traffic conditions in the locale of the user).

6. Most Relevant Information Set Delivered to Individual or Third-party User.

We adapt this general architecture to be of particular use to travelers (be they people or vehicles) involved with transportation systems (road; air, sea, or intermodal), and refer to it as LEIA-TR (for LEIA applied to TRansport).

What follows is a detailed description of how this adaptation is accomplished, using the particular example of automobiles. Although specific types of sensors and end-user applications are mentioned, these can always be enhanced, added-to, or replaced. The importance of the description is in showing how LEIA can be used as a general data-collection and analysis architecture relevant to transport systems.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 2:
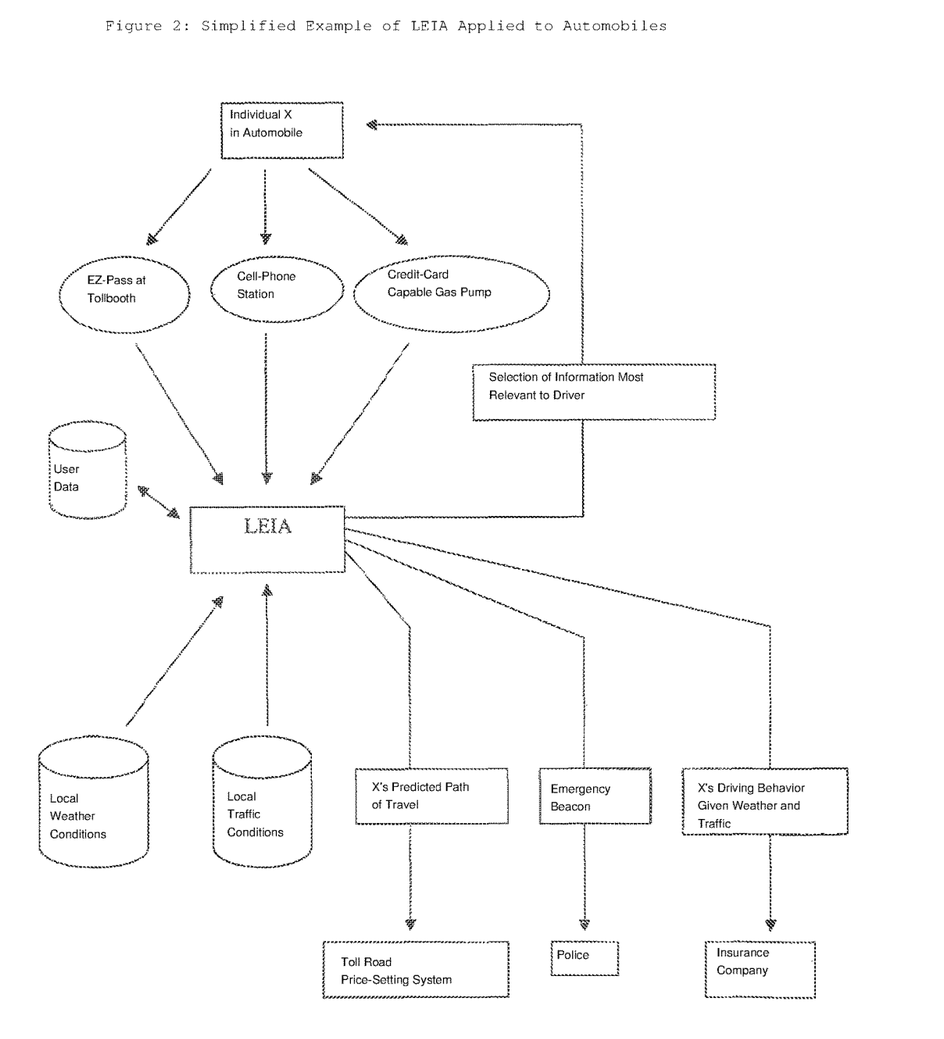
FIG. 2 is a simplified schematic description of the use of the LEIA system.

FIG. 2 gives a simplified schematic of the description that folks (and doesn't include all the details given in the description).

As applied to automobiles, LEIA-TR would adapt to the generalized LEIA framework in the following way:

1. Sensors acquire signals (generated actively and passively, bath internal and external to vehicle)

Global Positioning Satellite (GPS) receiver
Vehicles' current speed and directional acceleration
Automated recognition of license-plate tags by roadside cameras
EZ-Pass use at toll booths
Vehicles' biometrics sensors
Lo-Jack transmissions, (normally used as locational beacon in case of car theft)
Particular settings of car's near-view mirror, seat belt lengths, seat positions.
Logs and content pertaining to:
  e-mail
  telephone calls
  web browsing
  personal calendar agents
(These are communications generated either in-vehicle, or at home before trip)
Current traffic patterns
Day-of-year, day-of-week, current time and current weather.
Credit card, ATM, or public telephone transactions.

2. Sensors Emit Location Identifiers (LID)

LEIA-TR dies at the center of a web of sensors; when any of these are triggered by a traveler's passage, they transmit the information they've gathered to a central server. These transmissions, which are sent using a standard protocol, are termed Location Identifiers (LIDs).

It also is important to note that many of the sensors, such as those detecting biometrics, GPS coordinates, and vehicle driving behavior (e.g. pressure on the pedals, speed of turns, etc.), are located in the car itself, which transmits LIDs to a central server using wireless communication technology (e.g., the iridium satellite telephone). When a GPS receiver is installed in a vehicle, the geographical coordinates can be transmitted in conjunction with the LID's, thereby giving LEIA-TR a very accurate real-time estimate of the vehicle's location.

3. Secure System Uses LIDs to Deduce User Identifiers (UID)

Although the specific identity of an individual driver might not be known, LEIA-TR can make use of the available signals, as well as a database linked to the vehicle, to deduce the identity of the individual behind the wheel (whether it be the person's true identity or simply a pseudonym, depending on security settings). This non-parametric process is described in detail below.

Note on Computational Strategies

Although it is possible to naively dump all available sensor inputs into a computational "black box", the high dimensionality of the input space can potentially render even the largest data set sparse, reducing the effectiveness of LEIA-TR's inferences. A better strategy is to determine which inputs have the greatest effect on different outputs, constructing appropriate statistical inferences for each set.

There are, of course, a multitude of non-parametric techniques that can be used for classification; the power of a particular technique (be it nearest neighbor or a neural network) often depends on the particular nature of the data being examined. The following discussion will outline general computational approaches, but it should be understood that the particular algorithms used to implement them are fairly interchangeable, and might well depend on the particular nature of the data examined. For sets of data that happen to be particularly complex (i.e. nonlinear), it may be necessary for a data analyst to identify and focus on the most relevant subsets of the data.

Inferring the Identity of the Driver

A certain subset of the input data I, call it $I_D$, will be most useful for establishing the identity of a vehicle's driver (and perhaps other passengers). $D_i$ (where i indexes the licensed drivers in the family). This should be fairly straight-forward to establish; indeed, many luxury cars today have keys that allow them to distinguish individual drivers, automatically reconfiguring such details as the angle of the seat and tilt of the rearview mirror upon insertion of the key. Of course, this data could be supplemented by biometric readings (fingerprints, voiceprints) and physical behavior of the driver (foot pedal pressure, average speed, and the sharpness of turns). If this information were to be linked to the vehicle's wireless LID transmissions, LEIA-TR would have little trouble distinguishing, drivers.

Because such data should give a fairly unambiguous signal about the identity of the driver, the classification problem is straight-forward and could be economically handled by a rule-base, which slices the input space into fairly broad regions that correspond to different categories. An example of such a rule would be:

Given two drivers in the family ($D_1$=90-year-old grandmother, $D_2$=17-year-old male), Rule X. IF [(Speed>40 mph) AND (Radio_Music_Genre=Rock)] THEN (Driver=$D_2$)

There are numerous ways to perform the induction of such rules, for example by genetic programming or by estimating a non-parametric regression tree, both of which are well-understood and documented in the literature.

The resulting rule base can be thought of as a function r $I_D \rightarrow D$.

4. UIDs Used to Access Personal Profile Data.

Having derived a pseudonymous LTD for the individual behind the wheel of the vehicle, LEIA-TR connects to a proxy server containing:

Database of individuals' past driving behavior (destinations, cruising speeds, etc.
Database of individuals' demographic profiles
Database of individuals' past selection of information content (i.e., what radio stations did they listen to en-route?)
Computerized road maps (5,6) Most appropriate set of information chosen and delivered to driver or to third-party user.

In the final stages, information is processed and delivered, as defined by the application for which LEIA-TR has been configured. Sample applications, and users of interest, are listed below.

Application A: Personalized Information Delivery, for Drive (or Passengers) of Automobile Equipped with the proper sensors, given access to certain databases, and loaded with appropriate algorithms, LEIA-TR forms the foundation for an intelligent system capable of inferring drivers identities, predicting their future locations, and predicting the content of the information they'd like delivered to their in-car computers/viewing/listening systems. In short, LEIA-TR can be used as a wireless automotive "push" technology.

For example, one could imagine a commuter in California who on his way to work would like to get the latest stock quotes on Microsoft, check his offices voicemail, and hear the news from Germany, interspersed with local traffic reports. Although no radio station might provide this particular combination of programming, it could easily be supported by LEIA-TR. Linked to the user's car via a wireless connection, LEIA-TR would either be handed the driver's identity code (signaled by the car itself), or use the driver's behavior, biometrics, and EZ-Pass code to infer it. Taking into account the driver's past trips, personal calendar agent, date and time of day, LEIA-TR could predict the route that he will follow. Using information on current traffic patterns (as well as knowledge of the driver's preferred driving speed), LEIA-TR could estimate when the driver would be closest to various transmitting servers along his route, These would be loaded (pre-cached) with appropriate chunks of programming and traffic reports so that the driver will be provided with a constant stream of data as he goes to work. Economies of scale would also come into play; determining that many drivers are interested in the day's weather report, for example, LEIA-TR could load the report into a few servers in proximity to the most heavily-traveled traffic arteries. Each driver's programming would then be arranged so that the weather report would be loaded as they pass one of these central servers. Such coordination would require massive amounts of computation, but would be quite feasible using modem statistical techniques, and would certainly maximize the effectiveness of LEIA-TR's pre-caching technology.

Of course, pre-cached data need not pertain exclusively public information streams. If a passenger is accessing the Web, email, or voice mail, pertinent files can be transferred from remote file caches (e.g. those on his personal computer at home) to nearby servers.

Inferring Location, Current and Future

Once the driver's Identify has been inferred, LEIA-TR needs to be able to 1) predict current (if GPS LIDs are not available) and future location of the automobile, and 2) predict the driver's information needs. It is a much more challenging task to infer the current (and to predict the future) location of the vehicle, since it is not being constantly monitored: we might glimpse it at a toll-both as its EZ-Pass registers, or we might be handed a GPS code when the driver requests a digital road map. LEIA-TR must infer, from these irregular samples, the route of the vehicle, The appropriate portion of the input space, $I_L$, would include samples of communications, map data, GPS signals, EZ-Pass signals, Lo-Jack signals, automated license-tag readers, time and date stamp, weather conditions, and traffic conditions.

As disclosed in co-pending patent application entitled "Location Enhanced Information Architecture" the location information may be inferred from the relative signal strengths of a probable user's roaming signal as detected by two or more nearby cellular transmitter/receiver "towers.

LEIA-TR also has access to a database containing past routes and conditions for driver D. Since the vehicle would have been observed at different times and at different locations, the raw database might well be "patchy", in that some trips might only have a few location data points. One way to normalize this data would be the following: Assume that the car sends a signal to LEIA-TR, both upon ignition and upon being shut off. Every trip would then consist of $L_o$ (location when started), LT (location when parked), and most likely a series of $L_t$ (where for time t, 0<t<T), Using this information and a digital road map, LEIA-TR could then infer the full route followed. For example, if the starting location point was at the home, the ending point was at the office, and three locational signals fell on a superhighway, one could infer that the full route took the vehicle from the home to the on-ramp, along the highway to the off-ramp, then to the office. Having reconstructed the full path of each of these routes, it would then be possible to sample them at regular intervals, so that every trip in the database would be described by points on the same grid. In addition to standardizing the way we describe paths, this approach fills in the gaps for trips in which very few location readings were taken. Note that the grid can be defined by a distance (such as a half-mile interval), or more usefully, the position of transmitters that serve out information to passing cars. These gridded locations along a route can be thought as checkpoints.

Even after the location-points are standardized, this route history database will be extremely large, since it will contain a detailed record of every trip made by the car: the driver's identity, passengers' identities, various state variables (weather, time, driving patterns), and geographical paths driven. Some effort needs to be made to reduce the input space's dimensionality; this could be done through such methods as Principal Component Analysis, which could determine (for a commuter, e.g.) that the day-of-week and time-of-day are the most important variables needed for characterizing different routes taken by the car.

The raw route data is thus boiled down into a final, more compact, format. An entry in LEIA TR's database would then be of the form: (current-state (time, date, weather, etc. in compact form), $L_o$ (starting location), . . . , $L_n$ (nth location), . . . , $L_T$ (final location)).

In regular operation, LEIA-TR will maintain a similar vector, y, for the current trip: the state is boiled down to the compact form (for example, casting 9:15 am→Morning), and the previous location checkpoints are recorded.

At this point, there are a variety of standard nonparametric methods that can be brought to bear. Given the current state y of the automobile (occupants, time of day, day of week, etc.), and given the database of past routes taken by this automobile, which can be correlated with the former, it is possible to assign probabilities to the possible destinations for the current route being taken.

Note that many complexities can be added to this analysis. Using similar methods, we could, for example, generate a conditional probability $P(L_{t+n}|I_t, D, y)$ for the nth future checkpoint location (where $I_t$ represents the state information at time t). Thus, as the current trip's state vector y is updated, each checkpoint in the surrounding area can be assigned a probability that it will be passed by the target vehicle. LEIA-TR might then pre-cache data in those several locations with the highest probabilities.

By noting both the current traffic conditions, projected route, and D's average driving speed, it would be possible to predict the time at which the target vehicle will pass future location checkpoints, allowing LEIA-TR to optimize pre-caching. Among the many applications of pre-caching could be targeting of advertising at strategically pre-designated location(s) of the mobile user or, providing the user with personalized physical location relevant sites of interest or retailers (e.g., offering a user desired product(s), the targeting conditions for which, could be (previously) manually determined or performed automatically (as detailed or referenced in the parent case). Or manually approved criteria or objects of future anticipated proximity could be automatically recommend then approved by the user for automatic notification (then the object(s) (or objects relevant to the recommended criteria) come into physical proximity to the user. (E.g., some objects or criteria may not be determined to be definitively of high enough priority to the user's preferences to justify active notification.

An extra layer of Intelligence could be applied to situations in which a novel route is being undertaken (indicating, for example, a cross-country road-trip). LEIA-TR would then make use of phone and e-mail communications logs (looking for location keywords), as well as the driver's personal calendar agent, recent book purchases on Amazon.com, and so forth to determine the target's final destination. Intermediate checkpoints would then be interpolated.

Of course, those automobiles equipped with on-board navigational systems (such as NaviStar) would very likely have been programmed by the driver, in advance, with specific navigational goals. Little inference would need to be done, in such cases, as long as the vehicle remained on track.

Inferring Information Content

Finally, given an appropriate portion of the input space $I_c$, the Inferred driver D, and most likely path $L_1, \ldots, L_{final}$, it should be possible to predict the content of the information that the driver will request. In many cases, this should be straight-forward, and could be implemented by another rule-base. Assuming that $I_c$ includes the time-of-day, day-of-week and the driver's history of information requests, it should be possible to capture the patterns of information usage for typical commutes (news in the morning, classical music on the way home) or weekend activities (surf updates on the way to the beach) The parent case (LEIA) discussed pre-caching "panels" such as this in anticipation of the driver's entering a particular region for which it is expected that higher resolution displays and more detailed information will be needed.

The driver, of course, has the ability to directly control the information he receives, of course, and can send LEIA-TR explicit instructions for information at the touch of a button (a driver might not have had time to finish the New York Times over coffee at breakfast, and could request the articles be read to him in the car). Such exceptions to the non-parametric generation of likelihoods for content interest would be hard-wired into the rule-base, and could take the form:

Rule 1. IF (emergency button pressed) THEN (link cellphone to 911)

Other hard-wired exceptions might include road-trips; the rule-base, recognizing a novel travel path, could hand off control of the information content prediction routine to a nationwide travel system maintained by AAA, for example. This could display road maps, information about tourist attractions, locations of gas stations (when fuel runs low) and fast food restaurants (when lunchtime approaches).

More sophisticated users could also be given access to the content-delivery models directly; they could examine and modify the various thresholds that determine information-delivery in fuzzier situations.

Further Examples of Personalized information Delivery Applications i) Targeted Advertising If the user has a profile desirable to a particular advertiser, autonomous user-side agents could negotiate certain terms and conditions for the packaging of advertisements with the content to be delivered (The parent case expounds upon the issued patent system for Generation of User Profiles by discussing anonymous or pseudonymous user profiles which can be queried and accessed easily by advertisers who pay or can negotiate terms for rights to deliver ads to users).

The concessions by the user could include but are not limited to the user allowing the advertiser to deliver ads (or other content) relevant to the user's preferences via the in-car display (e.g., interspersed with other content which the user has selected for consumption) or audibly via the automobile's radio speaker system (either during a radio program's commercial breaks or otherwise) or via an electronic billboard. In each of these cases, if the advertising is relevant to the present location of the user, it may be preferentially delivered at those appropriate times) and via the delivery medium most accessible to the user, most opportune for the advertising message or otherwise preferred by the advertiser though ultimately subject to the term and conditions acceptable to the user.

ii) Personalized, Maps

It would be possible to provide on-board electronic map displays for mobile users which would be customized according to the users' interests. The maps could be programmed by the user to reveal certain categories of information, such as restaurants, nightspots, shopping (or a particular desired product), points of tourist or historical interest, etc.

The user can tune the system to be more or less selective in displaying personally relevant items, with various filtering options. For example, it might reveal only those restaurants which are low priced, ethnic, and open after 9:00 pm. The system may also notify the user as s/he comes within physical proximity of desirable sites.

iii) User-to-User Meetings

Such maps could also reveal the physical locations of other individuals with whom the user may be interested in scheduling meetings or even establishing a first-time contact (such a contact would be brokered through autonomous agents capable matching users having similar personal profiles). The parties personal schedules in combination with current and predicted future locations could be used to notify users, reveal mutual geographic locations, and even suggest (and direct users to) appropriate venues.

iv) Real-Time Traffic Reports

A simple but useful application of LEIA-TR, would evolve the real-time transmission of drivers' location information to a regional traffic-reporting bureau. This information would be analyzed for the locations of current and near-future traffic congestion, which would then be broadcast back to the drivers in the region. On-board navigation systems would then suggest alternate routes to individual drivers, given their current positions and predicted destinations.

Application B: In-Car Warning System, for Driver.

Because LEIA-TR has access to data both inside and local to a given automobile, it could be used to support a number of devices to improve safety for both drivers and passengers.

In addition to the sensors and communications devices already installed in a vehicle, it would be possible to add a small computer capable of communicating verbally with the driver. Being connected to the central LEIA-TR server via the wireless communications system, this device would be able to override most other in-car information systems to verbally deliver important safety messages to the driver, regarding events both within and external to the vehicle.

In the first case, the device might notice that the car is being driven too fast, conditional on the location, weather, traffic flow, and time if several accidents have occurred on the given stretch of road under similar conditions the driver would be informed of this fact. Furthermore, communications with personalized agents at the driver's home might reveal that the driver is lacking sleep or has consumed alcohol, both of which would give the safety device grounds for decreasing the threshold used to determine the need for a verbal warning. Conversely, if a driver is going rather fast, but current conditions are extremely good (straight road, no traffic, perfect visibility, warm and dry weather), the device could increase its warning threshold to avoid needlessly bothering the driver.

In addition to being linked to LEIA-TR's statistical databases, the safety device would have access to observations of current road conditions. Thus, given that a slippery patch of ice or traffic accident has been observed two miles ahead of the driver's current position, and which fail within the driver's predicted path, LEIA-TR could verbally warn the driver of the oncoming obstacle and perhaps provide an alternate route. It is conceivable that in the future, automobiles themselves would be mounted with miniature weather stations that would feed back into LEIA-TR. Thus, if a few cars encountered icy conditions on a certain stretch of road, it would take very little time for warning information to be sent to all vehicles heading for that location.

Such dynamically available weather information emitted from so many closely situated sources would also be valuable to enhance real time weather prediction models; e.g., if conditions producing ice, such as freezing rain, dense fog, heavy rain or hail, etc., are imminently likely to occur based upon weather patterns in the immediate vicinity, local warning could be issued for the imminent possibility of such conditions.

Data from front-mounted infrared camera systems are already of use in enhancing the real-time visual capabilities of drivers. In addition to warning of such conventional dangers as pedestrians or deer in the road, a LEIA-TR enabled vehicle could add other information to the heads-up display to enhance the safety of the driver. For example, notably dangerous curves in the road, or recently-detected patches of ice could be highlighted. Or, the user could be alerted to the presence of a high-risk driver, (identified by previous criminal records and current erratic driving). Anything deemed dangerous or worthy of attention could be "painted" on the windshield through the heads-up display. Especially useful during periods of low visibility, such a system would warn the driver of obstacles and recommend evasive strategies. Multiple vehicles equipped with LEIA-TR could automatically exchange locational data, thereby allowing for coordinated movement during such periods.

Finally, the system could war the driver when he is in danger of falling asleep at the wheel (and suggest courses of action, such as the location of the next motel or vendor of coffee); sleepiness could be inferred after long periods of non-stop driving, and by cameras mounted inside the vehicle capable of monitoring the driver's position and behavior (iris scanning is a useful way of detecting alertness).

Application C: Emergency Notification on System, for Police

Once an accident has occurred, victims frequently rely on passers-by to inform the proper authorities. If the accident has taken place in a remote location or during a heavy snow-storm, the victims stand a good chance of not being helped in time. If LEIA-TR's in-car system is still operational, it could use the car's communications system to send an automated call-for-help accompanied by the car's GPS coordinates, given that a certain number of anomalies have been detected (a violent acceleration or impact was recently registered, the car is positioned on its side or back, the driver is not responding to verbal pages, the vehicle is not moving, etc.).

In some instances, it would be advantageous for those passers-by qualified to provide emergency or medical assistance to be notified of a nearby motorist in need of help. While sending out a call for help, LEIA-TR could assess the severity of an accident (using previously suggested input variables) and determine whether qualified (and willing) individuals capable of providing emergency or medical help are in the vicinity.

In extreme cases, the in-car electronics may have been destroyed, as well. However, because LEIA-TR monitors the positions of all its users (via communicated GPS location stamps), the last known coordinates of a vehicle could still be instrumental in the search by authorities for a missing driver.

Application D: Traffic Flow Analysis, for Highway Engineers

In recent years, state highway departments have become much more sophisticated in their management of traffic flow, notably by using tollbooth systems able to dynamically adjust prices. Given that a morning rush hour is going to clog inbound lanes, for example, it is possible to temporarily charge drivers higher tolls for the use of principal arteries at critical times. This encourages drivers to travel via alternative routes, or to shift their commuting schedule away from peak hours. In a sense, the flexible tolls act as a market force that disperses incoming traffic across multiple routes and times, lessening overall traffic flow pressure.

The calibration of such a system is not trivial, however, and in some cases may actually increase problems if traffic flows don't change in the manner predicted. LEIA-TR provides a solution to this.

Located at the center of a complex web of inputs, LEIA-TR is able to record, in precise detail, the timing and direction of traffic flow, the estimated number of passengers, the types of vehicles, the state of the weather, the occurrence of traffic accidents, and overall road conditions. First of all, this information is highly useful for state-of-the-art traffic prediction models—given the time, date, weather, road conditions, and the state of nearby roads, LEIA-TR can efficiently forecast expected traffic flows. Moreover, a series of toll-setting experiments would provide LEIA-TR with the data needed to understand the incremental changes in traffic patterns due to toll prices, conditional on the current traffic state. The combination of LEIA-TR's extensive data-collection facilities with state-of-the-art statistical traffic models will therefore form the basis for a powerful new highway traffic control system. Finally it is worth to note that the ability to monitor and dynamically notify drivers of present or impending congestion problems can also provide valuable real time data to traffic reporting bureaus in a manner, which is much more accurate and up-to-date than current aerial based manual observation and recording.

LEIA-TR's ability to capture and provide for analysis, extremely detailed traffic flow and congestion data as a function of time would provide extremely valuable statistical data to state and regional highway departments and engineers for purposes of augmenting optimal highway design and expansion planning as well as associated budgeting to accommodate such needs. Such data may further be useful in detecting driver behavior patterns at certain points or stretches of roadway which are suggestive of bed predisposed to future accidents before they occur. Such statistics based informational systems could be used to create computer created statistical models of maps at regional or national scale revealing traffic flow patterns based upon various desired analysis criteria.

Application E. Insurance Analysis, for Automobile Insurance Companies

By pulling together massive amounts of finely detailed information on automobile drivers and their behaviors, LEIA-TR could be of great utility to the insurance industry; which relies on high-quality data for the construction of its pricing models. The data collected by LEIA-TR will exhibit both a quantity and quality of detail far exceeding that seen in insurance databases today, allowing for the construction of new generations of insurance models and insurance applications.

It should be noted that this example is intended to illustrate, how LEIA-TR's powerful data-collection facilities can be of practical use to a currently existing field. Actuaries have developed a body of specific pricing models to analyze claim data and personal policyholders' characteristics. These models have a double goal: first they aim at selecting the classification variables that are the most powerful in explaining loss data; then they use the selected variables to establish premiums for the various levels of coverage. Early models were based on selection techniques of regression analysis, but more specific models have been developed lately. The study of these models is part of the curriculum in most college actuarial programs around the world. In the United States, rate-making is the main subject of an examination administered by the Casualty Actuarial Society.

An overview of the main pricing models can be found in:
"Introduction to Ratemaking and Loss Reserving for Property and Casualty Insurance" Robert Brown, Actex Publications, Winsted, Conn., 1993
"Rate-Making" J. van Eeghen; E. Group and J. Nijssen, Surveys of Actuarial Studies #2, Nationale Nederlanden, Rotterdam, 1983 a. LEIA-TR's Contribution to Auto Insurance: The Collection of Highly-Detailed Behavioral Data By its very nature, the LEIA-TR architecture is ideally suited for the collection of highly-detailed information about motorists—their vehicles, behaviors, and locales. In this particular implementation, however, LEIA-TR will be operated less for the purposes of real-time interaction, and more as a passive data-collection system. However, the quality of this new data will be so precise that it is likely that entirely new classes of actuarial models will be based on it. Such models could be developed by applying linear as well as non-linear (e.g., kernel regression) analysis techniques to the following:
identity of driver and number of passengers
driver's age, sex, economic class, road behavior, sobriety
seat belt and child-seat usage
routes traveled (dates, times, speeds, and distances)
adverse conditions (weather/road)
annual mileage
vehicle overnight location
accident details (exact point of impact, speed at impact, wheel movement, effect of braking, etc.)

b. Application to Car Insurance Rate-Setting

The fundamental principle of insurance consists of forming a pool of policyholders. If all risks are not equal to each other, it is fair to ask each member of the pool to pay a premium that is proportional to the risk imposed on the pool. The main task of the actuary who sets up a new rating system is to partition the portfolio into homogeneous classes, with all drivers of the same class paying the same premium. The actuary has to subdivide the policies according to classification or rating variables; for instance, it has been shown in numerous statistical studies that young male drivers are more prone to accidents than adult females. Consequently age and sex of the main driver are used in most countries as rating variables, with heavy surcharges for young males. The identification of significant rating variables is an arduous task that uses sophisticated actuarial models based on multivariate statistical techniques.

The main variables currently used in most US states are
age, sex, marital status of main driver
car model (sports cars pay a hefty surcharge, for instance)
use of car (usually as a function of commuting mileage)
territory (overnight location of vehicle).
traffic violations and past accidents (over the past three years)
other variables commonly used include good student discount, multi-car discount, driver training discount, passive seat-belt discount, etc.

Data provided by LEIA-TR could improve the accuracy of rating in a tremendous way, by using the variables that have the best predictive power. LEIA-TR will revolutionize rating, by enabling insurers to select the most efficient rating variables. Currently, insurers have to rely on many proxy variables, variables that are notoriously inferior in terms of rating efficiency, but that need to be used since the best variables are either unavailable or subject to fraud. For instance:

1. Commuting mileage is used, as it is fairly easy for insurers to check (even though it is subject to fraud: many policyholders claim they take public transportation to work, while in fact they drive.) Commuting mileage is a poor variable, as it fails to take into account pleasure mileage, vacation mileage, use of car during the dangerous night hours. Annual mileage is a much better predictor of accident behavior than commuting mileage. Yet insurers are reluctant to use annual mileage, as it is subject to underestimation by policyholders. LEIA-TR could provide that useful information with accuracy, at a cost that would be substantially less than the cost of an annual physical inspection of the car's odometer.

2. Sports cars are not dangerous per se. The driver of a sports car usually is. The rationale for the use of sports car as a rating variable is that it is a fairly good proxy for the variable "driver of a sporting nature." By recording aggressive behavior on the road (maximum speed, accelerations, heavy usage of brakes, etc.) LEIA-TR could correctly identify dangerous drivers and tailor the surcharge for aggressive road behavior to the true driving pattern of the policyholder. This would also save companies the expense of organizing regular experts' meeting to decide which car model has to be classified as a sports car.

3. Moving traffic violations constitute a very poor evaluation of the respect of the driving code. Orgy a minuscule percentage of effective visions of the code lead to a police ticket. Moreover, the collection of traffic violation data is a very expensive procedure, as it implies constant contact between insurers and the state's, Motor Vehicle Agency. LEIA-TR could provide an accurate measure of the respect of the traffic code by insureds.

4. Discounts for good students or participation in driver training are weak attempts at identifying responsible young drivers. LEIA-TR could monitor the road behavior of young drivers much more accurately.

5. Insurers award a discount to cars equipped with passive seat belts, as they have currently no way of checking effective seat belt usage by drivers, With LEIA-TR, a much better variable (effective usage of seat belt) than passive seat belts could be used.

6. A current debate concerns the competency of elderly drivers: Although driving ability may degrade with age, it does so at different rates for different drivers, making it impossible to specify a general age threshold past which people cannot drive. In passively monitoring driving behavior, LEIA-TR may do an excellent job of extracting those features related to impaired reflexes, competency, and mental/sensory awareness. This information could be used to devise a much more accurate measure of an elderly driver's ability to drive safely:

7. Insurers currently have no way to measure a driver's likelihood of driving under the influence of alcohol. LEIA-TR would be able to conduct such measurements, using in-car breathalyzers or by detecting patterns of driving normally associated by law enforcement officers with DUIs.

These examples show that the data provided by LEIA-TR could be used to analyze and segment the driving population with a high degree of accuracy, allowing the particular risk of an individual driver to be accurately calculated and pried. Rather than being priced by rough demographics, an individual's insurance premium would be tailored-made for his particular situation and driving behavior. Insurance cancers making use of the data collection capabilities of LEIA-TR would enjoy a tremendous competitive advantage over companies that don't use LEIA-TR. They would be able to use a much more efficient set of classification variables, select the better risks, and consequently improve profitability.

Although a finer-grain classification of drivers and their behaviors would be of great use to insurance companies, there are substantial regulatory requirements which need to be overcome (on a state-by-state basis) before such algorithms can be legally used. In light of the need to improve the political acceptability of such methods, an alternative embodiment of LEIA-TR, which further protects the privacy of individual users, is presented here.

It is possible to put the pseudonymous proxy server (as described in our pseudonymous server patent) under the control of a user-side agent, which would also have access to the insurance companies actuarial models. The agent would automatically determine which portions of the driver's behavioral profile should be forwarded to the insurer, with the goal of minimizing premium costs to the driver. The information forwarded by the agent could not be tampered with by the driver, although he would have the option of manually switching off any portion of the information feed he desired. In this model, there is an effect of "incrimination by default" as poor drivers would invariably disclose fewer key components of their profiles. Thus, on a variable-by-variable basis those drivers disclosing less information to insurers would pay higher premiums than safe drivers willing to disclose their complete driving log, but in doing so would protect their privacy.

Of course, information of interest to automobile insurance companies would extend beyond simple driving behavior, and might include information gathered from medical records (e.g. containing information on drug use/abuse seizure disorders, depression, visual impairment, etc.) or health insurance companies (with whom automobile insurance companies might find it advantageous to trade data).

By publicizing the Informal learned in their analyses, automobile insurance companies could feed advice, on safer driving back to individual drivers, who would have an incentive to modify their behavior. As a driver learned to drive more defensively, his user-side agent would automatically release more information about his behavior to the insurance company, gaining him cheaper premiums.

c. Insurance Fraud Detection

LEIA-TR's extensive data collection facilities would be ideal for detecting (or at least flagging) insurance fraud, as well as cutting overall investigation costs. A few examples:

1. Territory is a variable subject to intensive fraud. So many policyholders use a fake address in rural South Jersey to avoid the Philadelphia surcharge that companies hire teams of private investigators to patrol the streets of Philadelphia at night, to identify cars with New Jersey dense plates. This expensive and inefficient procedure could be eliminated with LEIA-TR's ability to record location information.

2. In their applications, prospective policyholders have to record the percentage of use of each car by each member of the family. Usage by young drivers tends to be systematically underestimated. LEIA-TR could efficiently combat this fraudulent technique. For example, a car parked during the day at a high school would reveal that the usual driver was most likely a teenager, although the family buying the insurance has registered the father as being the exclusive driver. One of the rating difficulties faced by insurers nowadays is that they do not have a cost-effective way to verify who the "main driver" of each car is. LEIA-TR may be an answer to this major problem.

3. The "black boxes" installed in LEIA-TR users cars record every detail of a vehicle's workings (speed, direction, force of impact, etc.); this should allow for extremely accurate accident reconstruction's, which could be decked against accident claims. This would make it easier to correctly attribute liabilities and to gauge the likelihood of various types of injuries. For example, if the black box shows that an accident happened at a speed of fifteen miles per hour, claims of whiplash could be successfully contested. As long as a vehicle isn't completely demolished, the sensor devices would continue to monitor post-accident events, which might also prove important for later claims (e.g., if a supposedly immobilized driver is later identified pushing the vehicle).

In summary, LEIA-TR promises to be an extremely useful tool in reducing a major problem to insurance companies: information asymmetries. Such asymmetries, called adverse selection and moral hazard, arise when the company has difficulty in assessing the risk of each policyholder. Adverse selection arises from the improper classification of each risk this cost is transferred to the policyholders in the form of increased premiums: a result of imperfect information is that the 'good' drivers are subsidizing the 'bad' drivers. In addition to adverse selection, insurers face a moral hazard externality. The purchase of an insurance contract reduces the incentive of policyholders to act in a matter that minimizes the likelihood of a loss. Moral hazard occurs because policyholders act in a way that is unobservable to the company.

LEIA-TR's data collection provides individual-specific information that will increase the ability of the insurance company to discern between the drivers' ability and behavior, reducing adverse selection. This will allow the proper categorizing of each risk. Good drivers will be rewarded, bad drivers will be penalized. As a result, the proper recognition of driving ability will reduce subsidization of the bad drivers. Their premiums will increase. Consumer monitoring will reduce unobservable behavior, decreasing the effect of moral hazard. In view of these decreased externalities, substantial premium reductions will likely be offered to vehicles that have LEIA-TR.

d. Alternate Embodiments

Although the embodiment described above provides a solution specifically for the determination of automobile insurance, LEIA-TR could substantially improve other types of actuarial models.

a) Life/Health insurance—Certain risky behaviors, such as excessive speeding, driving under the influence, or, failure to use seatbelts regularly are factors observed by LEIA-TR which should have a definite impact on life and health insurance calculations. It would be possible to extend LEIA-TR's capabilities so that non-vehicular activities could be also detected and analyzed. For example, once a driver has left his vehicle and moves on foot, LEIA-TR would acquire LIDs from local dial-up exchanges, point-of-sale purchases by credit card, ID badge scans, cell-phones, two-way pagers, hotel and airport transactions, etc. Combining this information (which allows LEIA-TR to track the time and location of a pedestrian's route) with information describing local conditions (crime, traffic, and pollution levels), an extremely detailed set of data relevant to health and life Insurance companies could be developed. This archive of information could then be used to gauge the level of risk in the full range of an individual's daily behavior, both inside and outside-his vehicle, allowing the insurance company to set pries accordingly.

b) Aircraft Insurance: As another example, pilot and airplane insurance could be more accurately priced using panel data sets collected and analyzed by LEIA-TR. In this mode, LEIA-TR's inputs would include air traffic control systems, (for location/altitude data), "black boxes" (on-board flight recorders which catalog in high detail the particular operations of a given airplane), pilot ratings, maintenance records (giving the age and mileage of various components), weather logs, and the like. In addition to aiding insurance companies, such a comprehensive collection of information would undoubtedly be of use to companies in the business of building safer and more reliable airplanes.

Application F:LEIA-TR and Marketing

1) Database Marketing Companies

Some GIS software companies provide geographic mapping software solutions for database marketing companies, see www.caliper.com. Using the iReactor technology, it is possible to correlate demographic data of on-line users with other types of content and purchasing preferences as demonstrated on-line. These preferences may be either captured on a site-specific basis and/or (ideally) via the preferences elicited by the user across all sites that the user visits. Given these correlations, it is possible to utilize these demographics to identify on a location specific basis the most prevalent content and consumer purchase characteristics, of those on-line users which are most similar to the demographic profile which characterizes that geographic region. As a result, off-line advertising campaigns can be better targeted.

2) Market information for Retailers

Using LEIA-TR the complete profile and retail transactional histories of users can be determined such that it is possible for retailers to gain access to this data to determine the product propensity buying patterns of individuals who browse aisles of their stores, who physically drive or walk past or near their stores or more subtle information such as those who browse but don't purchase, those who browse, don't purchase but have a predicted propensity to purchase the types of inventory selections available, or are average or high-end purchasing customers. This information could be used to allow the retailer to make deductions about such things as overall inventory selection, the prominence of certain selections in the store, the product or special discount advertisements that would be most efficient to advertise at the front of the store or to pedestrians outside 3) Mapping Commensal, Industrial and Residential, Real Estate Market Opportunities A very useful application of LEIA involves the collection of traffic pattern data on a time-specific basis (the day of the week and time of day) for the traffic, as it passes each piece of real estate. An electronic map, which is ideally Web-based, is generated and constantly updated based upon this data, which will be useful for assessing the commercial and residential real estate possibilities of a given location.

Additional information may be provided which may include (but is not limited to):

a. Origin and destination information of the vehicular traffic (as captured by LEIA) which may, especially if correlated with time, suggest the nature and context of the driver's activities, e.g., rush hour traffic, errand traffic, etc. It may be useful to factor in the type of neighborhood the vehicle returns to every night, the type of commercial or business entity she/he drives to work to each day, etc.

b. Other activity-related clues which the user is willing to release, e.g., devices interacted with, content interacted with or transmitted information, etc., which may provide insights into the mind-set of which users tend to experience when in the vicinity of the real estate property.

c. User Profile Data—Aggregate purchase and content affinities as well as price elasticity data (gleaned from purchase statistics) could be very useful information to commercial real estate developers and purveyors. Users with the right profile and a receptive mindset are of particular interest.

It should be noted that the present system may be extended to residential real estate. e.g., what types of jobs (such as quality of jobs) do local commuters have? What are their numbers? How far do they commute (particularly if they tend to commute further than the present real estate site)? Do their commuting routes tend to pass the current potential real estate site? The last three questions would also be particularly relevant as well for a prospective industrial real estate development opportunity.

Industrial real estate developers also may be interested in mapped models of real estate depicting the professional and known likely educational characteristics of the associated local residents in that region? What are the other businesses at which they work? (If available) what are their particular positions/responsibilities?

4) Creating Traffic and User Profile Models of Traffic Passing Billboard Sites a Providing a Map of Such Information on an Available Billboard Site Basis The presently described techniques for providing dynamically updated informational maps containing detailed statistical data regarding vehicular traffic passing real estate sites can be further extended to similar maps of interest to advertisers which contain locations for available highway billboards. The present system further provides Web-based access, which enables advertisers to make reservations and purchases of such billboards. In one preferred variation, an economic, model is deployed to optimally price the billboards. I.e., a varied representative sample of each type of billboard sharing similar traffic/user profile features with others is auctioned for this purpose. In another variation this on-line auction model is deployed for all billboards available by the system in order to provide a novel service to advertisers which is a "billboard auction" site.

Application G. LEIA-TR and e-Commerce

1) Dynamic Monitoring/Recording of On-Line Traffic Patterns of Visitors to a Web Site Real time data mining analysis of Web-wire visitor traffic flow statistics using traffic flow analysis tools in combination with data mining tools, can reveal (in real time):

a) Where user traffic from the site is coming from, by geographic region of the POP through which the user (who may be mobile) is accessing the network server. Possibly physical address of the users may be reloaded as well for data aggregation purposes. This information may be of value to vendors who desire targeting the user with advertiser desired information, i.e., targeting by desired profile features and/or location characteristics with detailed knowledge of what are the typical site navigation and/or product purchase characteristics of the users possessing certain profiles and how do they compare with other visitors. What are the comparative statistics between different types of user profiles.

b) The sites the user is coming from and going to with regards to the vendor's site. From this data, we can correlate specific geographic and Web usage characteristics with certain types of actions on that vendor's site; e.g., where geographically, do most of the high spending customers within product category X come from, from which competitors do most of these customers go to, particularly when they stop coming back to the site (or more generally, what characterizes the behavior of these wayward customers)? What other sites or content do users with certain product consumption characteristics tend to prefer? Real time site usage and product transaction statistics can thus reveal which advertising campaigns (on-line or off-line) are most successful (as measured through real-time feedback). From which geographic regions (and Internet sites) does each campaign (and media type) elicit the greatest on-line user response? These performance statistics can even be measured on a product or category level. It is further of value to consider what are the spending patterns (particularly on competitor sites of certain desirable customer segments (e.g., which either represent the profile features of that vendor's typical customers or top customers). (Note that such data could be accessed in aggregate from the ISP by regional POP server or even wireless capturing data transmissions from the wireless. ISP or cellular provided also pertaining to off-line transactions invariably further requires active cooperation with the user, e.g. at the client or network proxy level and/or his/her transaction processing entities such as credit cards and bank.

c) in a similar extension of the system, we can provide advertisers with a nationwide overview using GIS software of where, geographically, their ideal target prospects are located. Again off-line campaigns can be better targeted and if the products/services of the advertiser are location dependent, she/he can set rules to target individuals who are near the advertiser's physical site or, conversely, near a competitor's site (again subject to terms/conditions as negotiated between the advertiser and customer). If these customers at the point of purchase are willing to reveal their profiles (such as physical address and site usage statistics), off-line vendors can better determine where to target off-line campaigns and on which sites to deliver their advertising for their off-line products/services. What's more, iReactor can measure the immediate transaction response rate by product as these various campaigns are initiated; thus validating and quantifying the direct commercial benefits to the vendor, e.g., geographics, advertising in certain regions or demographics, or sites could be directly correlated to spikes in sales volumes within X category(s) of the products or services.

If the user is willing to further reveal real-time anonymized location data about themselves, the system is able to identify the particular physical location(s) which best reach the target audiences as well as subsequently measure the direct effectiveness of these billboard campaigns, e.g., X percent of users who pass a billboard Y or billboards with message Z make a related purchase with that vendor.

Why limit marketing performance analysis to a vendor? iReactor can provide much of this same intelligence about the competition, e.g., what on-line (or even possibly off-line advertising messages result in traffic and purchase activities on-line for that competitor.

2) Personalized Search Engine

A personalized search engine which considers the content domains of interest to the user and what types of results other individuals most like that particular user tend to retrieve and ignore given a particular query. This data in combination with the search activities of the user enable this system to learn how to better personalize future search results for that user. Both the portal and search engine could be further personalized based upon the physical location user, or alternatively, a physical region(s) manually entered by the user. It is reasonable to allow the browsing interface to enable the user to access menus (e.g., hierarchical) site listings, search results or particular URLs and navigate to other sites based upon content similarity, location similarity (or both) or to navigate sites based upon modifying these criteria.

3) Personalized Content

Personalized Content Such as Radio or Other Multimedia Information Customized by Location of the User—With the advent of increased bandwidth over wireless networks and decreased cost of local memory, it is certainly an appropriate application to provide the user with more robust, personalized and location development content, such as multimedia with video/audio components via the automobiles on board multimedia terminals. This content may include advertising, news, weather, relevant privileged news stories or financial information.

A Generalized major portal search and Web browser interface—All of this information may be both multimedia (video and audio) or as desired by the user, it may preclude strictly an audio component. The system may constantly feed information to the user which is automatically personalized, based upon manual search or filtering criteria and/or relevance to the specific location of the user, as the user comes into physical proximity to sites or Objects of interest. Or in a variation of the location filtering features, the user may specify a particular location or locations which are of interest manually instead of, passively, receiving information which is relevant to the user's present temporal location. Certainly, notification is one mode by which the system can be used such as either automatically based upon that information which is automatically measured to be above a certain predicted threshold of interest to the user or as based upon manual preference settings. This information may be either location relevant or alternatively may be information delivered via broadcast radio or satellite TV (e.g., radio news for which storm of high-level personal interest are delivered to the user on a specifically user designated channel(s) or from any channel while the user is in an active listening mode or while the radio is turned off. (The virtual radio channel concept was discussed in issued patent "System for the Customized Electronic Identification of Desirable Objects"). Radio content whether broadcast or unicast could certainly be specifically targeted based upon regional relevance (e.g., categories such as news stories, regional ads for fine dining, etc., which are regional or highly regionally specific to the present location of the user 4) "What's related" Links Providing an Alexa-like functionality to the personalized portal. It is reasonable to bias these personalized portal links also by the present location of the user and GIS software can be used to show the geographic locations of physical sites, vendors, and products associated with the personalized location enhanced portal. The parent case also describes an automated technique based upon the content analysis methods for detecting and automatically generating links to the pages which are most related to a given page.

5) Location-Specific Web Pages

If desired, as a user browses from site to site, this GIS map could be represented as a persistent button on the browser display which allows the user, with the click of a mouse, to pop up a GIS map, showing the physical location of the vendor, products/services, or Internet site, geographically as the user views the page. In fact, in a more advanced version any content which is geographically relevant could be represented in this manner. Place names in the text can be correlated with the associated physical locations on the map. E.g., a news site such as world news could allow the user to observe news events as they occur.

6) Personalized Recommendations by Vertical

The iReactor recommender engine can also provide search and filtering capabilities by particular vertical industries. An example of a particularly commercially compelling vertical may include a travel portal which allows a user to view travel destinations on a GIS map, zooming on desired (or personally recommended) locations or attractions and then view multimedia displays of those selections. The present functionality could be usefully integrated into a general automobile (or pedestrian) GIS and navigational system (as described above) enabling (via notification of persistent or selective content feed) delivery of location relevant fraud information via the portal.

7) Bargain Finder

The user is browsing a vendor's site with his/her (PDA or stationary PC) and identifies and an exotic fragrance from Victoria's Secret. The system may reveal to the user not only other vendors which sell that perfume but also whether or not it is presently in stock, the locations of these other vendors, (e.g., ranked in ascending order of physical distance, price or other feature or purchase/delivery related information). GIS can then accordingly provide a mapping display revealing the geographic locations of the various vendors as listed by the bargain finder. GIS can further reveal the preferred driving routes for each vendor given the user's present location (and using GPS) even dynamically instruct the user of which street or road to follow, dynamically while on route reveal their geographic distances and GIS location with associated pricing and other relevant buyer information. The system may even be used whereby this functionality quid be provided as a solution for individual sites. The user's PDA is used to scan a bar code or enable the user to input a universal identifier code or name of a product which the user browses in a store. The system will identify that product along with price, features, etc, in all other local vendor stores (as well as possibly on-line). What's more, the iReactor recommender engine could even recommend up-sells, cross-sells and other products which are also liked by users who prefer that item. This technique (particularly with the per-item inventory availability function), can be used to direct the user to the most convenient location which matches the desired criteria, or in a variation, to also replace a given item when it must be replenished from the user's kitchen. In this way the system can even manage a home maker's shopping list. The system may even reveal to each of these vendors detailed information including comparative statistics regarding what factors tend to affect the user's purchasing decisions compared with that of the competition. Each vendor may then set customized rules which act in response to certain user features to better capture buyer loyalty (e.g., automatically provide counteroffers to combat a competitor's discounts offer home delivery, etc., or other value added benefits).

An example of a particularly commercially compelling vertical may include a travel portal which allows a user to view travel destinations on a GIS map, zooming on desired (or personally recommended) locations or attractions and then view mull-media displays of those selections. The present functionality could be usefully integrated into a general automobile (or pedestrian) GIS and navigational system (as described above).

8) Real-Time Information Delivery to On-Line Shoppers Regarding the Location and Present Delivery Capability of a Delivery Truck or Mail Truck Containing a Desired Object(s)

Co-Pending Patent Application Entitled "Secure Data Interchange" suggests an intriguing and novel application for LEIA-TR in which users browsing an on-line retailer are able to receive updated real time information regarding the present whereabouts of a subset of inventory selections offered on-line and which are carried by a deliver truck or alternatively a mail truck whose inventory selections are based upon the preferences of the users who tend to access that site. Along with each inventory selection which is also carried by a regionally local delivery or mail truck, the price (which is directly related to the transit time of the nearest available vehicle carrying that particular selection. Marketing models can be used to determine the optimal price which a vendor can request in which pricing parameters may be initially set based upon an auctioning approach.

CONCLUSION

Although this detailed example has focused on automobiles, the system described by this patent is relevant and applicable to any and all forms of transportation.

Overall, LEIA-TR offers a novel and useful new approach towards collecting and making active use of data that is currently being lost in the day-to-day flow of transport systems.

While the invention has been particularly shown and described with reference to a preferred embodiment, it will be understood by those skilled in the art that various changes in form and detail may be made therein without departing from the spirit and scope of the invention.

What is claimed is:

1. A method of communicating electronically, comprising:
    acquiring, at a server, location information for a plurality of mobile devices;
    identifying, by the server, a particular mobile device of the plurality of mobile devices;
    accessing, by the server, a personal profile for said particular mobile device, wherein said personal profile includes a travel route history database of the particular mobile device; and
    delivering, by the server, digital content to said particular mobile device, the digital content for delivery being determined based upon preferences identified in said personal profile, the location information, and a history of information requests from the particular mobile device corresponding to one or more routes in said travel route history database.

2. The method of claim 1, further comprising:
determining, by the server, a current location and a predicted future location of said particular mobile device based on the location information; and
determining, by the server, a corresponding route in said travel route history database using at least one of: said current location and said predicted future location.

3. The method of claim 1, further comprising:
utilizing autonomous user-side agents to negotiate terms and conditions for a receipt of an advertisement, wherein digital content is delivered to said particular mobile device based upon said negotiated terms and conditions.

4. The method of claim 1, further comprising:
determining, by the server, a corresponding route in said travel route history database using the location information.

5. The method of claim 4, wherein the delivered digital content corresponds to requested content in the history of information requests for the corresponding route in said travel route history database.

6. The method of claim 1, wherein acquiring the location information for the plurality of mobile devices includes:
receiving a location and a time, the digital content for delivery being further determined based upon the time.

7. The method of claim 6, wherein the personal profile for said particular mobile device includes a calendar, the method further comprising:
identifying the one or more routes in said travel route history database using the calendar and the time.

8. The method of claim 1, wherein the particular mobile device is identified using an identity code.

9. The method of claim 1, wherein the particular mobile device is identified using biometric information.

10. The method of claim 1, wherein the location information includes at least one of: a global positioning system code and information from a toll-booth device.

11. The method of claim 1, wherein routes in the travel route history database are defined by points on a grid, and wherein an entry of a route in the travel route history database includes a series of points on the grid.

12. The method of claim 11, wherein different entries of different routes in the travel route history database are characterized by one or more variables that include at least one of: day-of-week and time-of-day.

13. The method of claim 1, wherein the history of information requests include requests for news and music.

14. The method of claim 1, wherein the travel route history database stores routes as entries that include a set of state variables stored in association with a sequence of locations and in association with the history of information requests.

15. The method of claim 14, further comprising:
performing an analysis of records of individual trips to obtain a reduced number of routes to store as entries in the travel route history database.

16. The method of claim 15, wherein the analysis is a Principal Component Analysis.

17. The method of claim 14, wherein the sequence of locations of a route are sampled at regular intervals by the particular mobile device.

18. A system for communicating content using a communications network, the system comprising:
one or more network servers on the communications network operative to:
acquire location information for a plurality of mobile devices;
identify a particular mobile device of the plurality of mobile devices;
access a personal profile for said particular mobile device, wherein said personal profile includes a travel route history database of the particular mobile device; and
deliver digital content to said particular mobile device, the digital content for delivery being determined based upon preferences identified in said personal profile, the location information, and a history of information requests from the particular mobile device corresponding to one or more routes in said travel route history database, the one or more network servers including memory that stores the location information.

19. The system of claim 18, wherein the one or more network servers on the communications network are further operative to:
determine a current location and a predicted future location of said particular mobile device based on the location information; and
determine a corresponding route in said travel route history database using at least one of: said current location and said predicted future location.

20. The system of claim 18, wherein the one or more network servers on the communications network are further operative to:
utilize autonomous user-side agents to negotiate terms and conditions for a receipt of an advertisement, wherein digital content is delivered to said particular mobile device based upon said negotiated terms and conditions.

21. The system of claim 18, wherein the one or more network servers on the communications network are further operative to:
determine a corresponding route in said travel route history database using the location information.

22. The system of claim 18, wherein acquiring the location information for the plurality of mobile devices includes:
receiving a location and a time, the digital content for delivery being further determined based upon the time.

23. The system of claim 22, wherein the personal profile for said particular mobile device includes a calendar, wherein the one or more network servers on the communications network are further operative to:
identify the one or more routes in said travel route history database using the calendar and the time.

24. The system of claim 18, wherein the particular mobile device is identified using biometric information.

25. The system of claim 18, wherein routes in the travel route history database are defined by points on a grid, and wherein an entry of a route in the travel route history database includes a series of points on the grid.

26. The system of claim 25, wherein different entries of different routes in the travel route history database are characterized by one or more variables that include at least one of: day-of-week and time-of-day.

* * * * *